United States Patent
Bellehumeur et al.

(10) Patent No.: US 12,378,393 B2
(45) Date of Patent: Aug. 5, 2025

(54) ROTOMOLDING COMPOSITIONS WITH LOW RELATIVE ELASTICITY

(71) Applicant: NOVA CHEMICALS (INTERNATIONAL) S.A., Fribourg (CH)

(72) Inventors: Celine Bellehumeur, Calgary (CA); Brian Molloy, Airdrie (CA); Amin Mirzadeh, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 511 days.

(21) Appl. No.: 17/918,625

(22) PCT Filed: Apr. 9, 2021

(86) PCT No.: PCT/IB2021/052961
§ 371 (c)(1),
(2) Date: Oct. 13, 2022

(87) PCT Pub. No.: WO2021/214584
PCT Pub. Date: Oct. 28, 2021

(65) Prior Publication Data
US 2023/0159732 A1    May 25, 2023

Related U.S. Application Data

(60) Provisional application No. 63/012,380, filed on Apr. 20, 2020.

(51) Int. Cl.
*C08L 23/08* (2025.01)
*B29C 41/00* (2006.01)
(Continued)

(52) U.S. Cl.
CPC ............ *C08L 23/08* (2013.01); *B29C 41/003* (2013.01); *B29C 41/06* (2013.01);
(Continued)

(58) Field of Classification Search
CPC .. C08L 23/08; C08L 2205/025; C08F 210/02; C08F 2500/05; C08F 2500/12; C08F 2500/07
See application file for complete search history.

(56) References Cited

U.S. PATENT DOCUMENTS

| | | |
|---|---|---|
| 5,132,380 A | 7/1992 | Stevens et al. |
| 5,198,401 A | 3/1993 | Turner et al. |

(Continued)

FOREIGN PATENT DOCUMENTS

| | | |
|---|---|---|
| CN | 103917592 A | 7/2014 |
| CN | 105164197 A | 12/2015 |

(Continued)

OTHER PUBLICATIONS

ASTM 1238-13, Standard Test Method for Melt Flow Rates of Thermoplastics by Extrusion Plastometer, May 27, 2019, 16 pages.
(Continued)

*Primary Examiner* — Mark S Kaucher
(74) *Attorney, Agent, or Firm* — Thomas J. Styslinger (57) ABSTRACT

High density polyethylene compositions having a high flow index and a bimodal composition provides an outstanding combination of processability, stiffness and ductility in rotomolded articles. The compositions have a low relative elasticity (G'/G", measured at 0.05 rad/sec) of less than 0.03.

11 Claims, 6 Drawing Sheets

(51) Int. Cl.
  *B29C 41/06* (2006.01)
  *B29K 23/00* (2006.01)
(52) U.S. Cl.
  CPC .............. *B29K 2023/065* (2013.01); *B29K 2995/0046* (2013.01); *B29K 2995/0063* (2013.01); *B29K 2995/0082* (2013.01); *C08L 2205/025* (2013.01)

(56) References Cited

U.S. PATENT DOCUMENTS

| | | | |
|---|---|---|---|
| 5,292,845 | A | 3/1994 | Kawasaki et al. |
| 5,376,439 | A | 12/1994 | Hodgson et al. |
| 5,382,630 | A | 1/1995 | Stehling et al. |
| 5,382,631 | A | 1/1995 | Stehling et al. |
| 6,969,741 | B2 | 11/2005 | Lustiger et al. |
| 8,022,143 | B2 | 9/2011 | Wang |
| 8,486,323 | B2 | 7/2013 | Davis et al. |
| 9,695,309 | B2 * | 7/2017 | Bellehumeur .......... B32B 3/266 |
| 10,023,706 | B2 | 7/2018 | Bellehumeur |
| 2002/0042472 | A1* | 4/2002 | Ong ........................ B01J 8/26 525/247 |
| 2004/0062942 | A1* | 4/2004 | Lustiger ............. C08L 23/0815 428/523 |
| 2013/0310532 | A1* | 11/2013 | Bellehumeur ...... C08L 23/0815 264/503 |

FOREIGN PATENT DOCUMENTS

| | | | | |
|---|---|---|---|---|
| CN | 105705572 A | | 6/2016 | |
| EP | 2599828 A1 * | | 6/2013 | .......... C08L 23/0815 |
| WO | WO-2005/121239 A2 | | 12/2005 | |

OTHER PUBLICATIONS

ASTM 1822-13, Standard Test Method for Tensile-Impact Energy to Break Plastics and Electrical Insulating Materials, Aug. 26, 2022, 11 pages.
ASTM 256-10E1, Standard Test Methods for Determining the Izod Pendulum Impact Resistance of Plastics, Aug. 26, 2022, 20 pages.
ASTM 5628-18, Standard Test Method for Impact Resistance of Flat, Rigid Plastic Specimens by Means of a Falling Dart (Tup or Falling Mass), Oct. 16, 2019, 10 pages.
ASTM 6467, Standard Test Method for Torsional Ring Shear Test to Determine Drained Residual Shear Strength of Fine-Grained Soils, Aug. 26, 2022, 8 pages.
ASTM 6645-01, Standard Test Method for Methyl (Comonomer) Content in Polyethylene by Infrared Spectrophotometry, (Reapproved 2010), 4 pages.
ASTM 792-13, Standard Test Methods for Density and Specific Gravity (Relative Density) of Plastics by Displacement, Feb. 24, 2014, 6 pages.
Randall, "A Review of High Resolution Liquid Carbon Nuclear Magnetic Resonance Characterizations of Ethylene-Based Polymers," JMS-Rev. Macromol. Chem. Phys., C29(2 & 3), pp. 201, 202, 285, 286 (1989).

* cited by examiner

ROTOMOLDING COMPOSITIONS WITH LOW RELATIVE ELASTICITY

CROSS-REFERENCE TO RELATED APPLICATIONS

This application is a U.S. National Phase Application under 35 U.S.C. § 371 of International Application No. PCT/IB2021/052961, filed Apr. 9, 2021, which claims priority to and the benefit of U.S. Provisional Application No. 63/012,380, filed Apr. 20, 2020, both of which are hereby incorporated by reference in their entireties.

TECHNICAL FIELD

The present disclosure relates to high density polyethylene compositions for use in rotomolding articles. The compositions have high stiffness and ductility. The compositions also have a high flow index which facilitates molding, especially for parts with complex shapes and geometries. The compositions have a low relative elasticity (G'/G").

BACKGROUND ART

There are a number of different considerations for manufacturing a resin suitable for use in rotomolding manufacture, non-limiting examples include: the resin needs to be capable of production at commercially acceptable rates of production; the resin needs to be suitable for use in the rotomolding process (e.g., for example, having a suitable sintering temperature and a suitable cooling rate to be removed from the mold); and the final rotomolded parts must have suitable properties for the end use applications.

U.S. Pat. Nos. 5,382,630, and 5,382,631 issued Jan. 17, 1995 to Stehling, assigned to Exxon, teach bimodal resins having superior physical properties. The patent requires that the blend have two or more components each having a polydispersity (Mw/Mn) less than 3 and the blend having a polydispersity greater than 3 and no component in the blend having a relatively higher molecular weight and a lower comonomer content (i.e., the comonomer incorporation is reverse).

U.S. Pat. No. 6,969,741 issued Nov. 29, 2005 to Lustiger et al., assigned to ExxonMobil teaches a blend of polyethylenes suitable for rotomolding. The patent teaches the difference in the density of each component is not less than 0.030 g/cm³. The difference in the densities of the component polymers in the present composition is less than 0.030 g/cm³.

U.S. Pat. No. 8,486,323 issued Jul. 16, 2013 in the name of Davis, assigned to Dow Global technologies Inc., teaches polymer blends used in rotational molded articles and having a high impact resistance. The blends have a residual unsaturation of less than 0.06 per 1000 carbon atoms.

SUMMARY OF INVENTION

One embodiment of the invention provides:
a bimodal polyethylene composition having
1) a molecular weight distribution, Mw/Mn, of from 2.3 to 5.5;
2) a density of from 0.940 to 0.957 g/cc;
3) a melt index, I2, as measured by ASTM D1238 at 190° C. using a 2.16 kg load of from 4 to 10 grams per 10 minutes; and
4) a relative elasticity, G'/G" when measured at 190° C. and 0.05 rad/second of less than 0.03 rad/sec, wherein said bimodal polyethylene composition comprises:
A. from 10 to 70 weight % of a first ethylene copolymer having:
  A.i. a melt index, I2, as measured by ASTM D1238 at 190° C. using a 2.16 kg load of from 0.4 to 5 grams per 10 minutes;
  A.ii. a molecular weight distribution, Mw/Mn, of from 1.8 to 3.0; and
  A.iii. a density of from 0.920 to 0.950 g/cc;
B. from 90 to 30 weight % of a second ethylene copolymer having:
  B.i. a melt index, I2, as measured by ASTM D1238 at 190° C. using a 2.16 kg load of from 4 to 1500 grams per 10 minutes;
  B.ii. a molecular weight distribution, Mw/Mn, of from 2.3 to 6.0; and
  B.iii. a density that is greater than the density of said first ethylene copolymer but less than 0.967 g/cc;
with the proviso that the density of said first ethylene copolymer is lower than the density of said second ethylene copolymer by an amount of from 0.010 to 0.035 g/cc.

Another embodiment provides a process for the production of polyolefin hollow articles, which comprises charging the bimodal polyethylene composition of claim 1 into a mold, heating this mold in an oven to above 280° C., such that the stabilized polyolefin fuses, rotating the mold around at least 2 axes, the plastic material spreading to the walls, cooling the mold while still rotating, opening it, and taking the resultant hollow article out.

Another embodiment provides a process to make a bimodal polyethylene composition as above, comprising feeding ethylene and one or more $C_{4-8}$ comonomers to two sequential solution phase reactors, in the presence of a single site catalyst comprising a phosphinimine ligand together with one or more activators in the first reactor and a Ziegler Natta (ZN) catalyst in the second reactor. In an embodiment, the single catalyst is defined by the formula:

wherein M is selected from the group consisting of Ti, Zr and Hf; PI is a phosphinimine ligand of the formula:

wherein each $R^{21}$ is independently selected from the group consisting of a hydrogen atom; a halogen atom; hydrocarbyl radicals, typically, $C_{1-10}$, which are unsubstituted by or further substituted by a halogen atom; $C_{1-8}$ alkoxy radicals; $C_{6-10}$ aryl or aryloxy radicals; amido radicals; silyl radicals of the formula:

wherein each $R_{22}$ is independently selected from the group consisting of hydrogen, a $C_{1-8}$ alkyl or alkoxy radical and $C_{6-10}$ aryl or aryloxy radicals; and a germanyl radical of the formula:

wherein $R_{22}$ is as defined above; L is a monoanionic cyclopentadienyl-type ligand independently selected from the group consisting of cyclopentadienyl-type ligands, Y is independently selected from the group consisting of activatable ligands; m is 1 or 2; n is 0 or 1; p is an integer and the sum of m+n+p equals the valence state of M.

A further embodiment provides a rotomolded part consisting essentially of the above bimodal polyethylene composition. In another embodiment, rotomolded parts made from the above bimodal polyethylene composition exhibit ductile failure.

DESCRIPTION OF EMBODIMENTS

Numbers Ranges

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties of the disclosed embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of this disclosure are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

Figure 1:
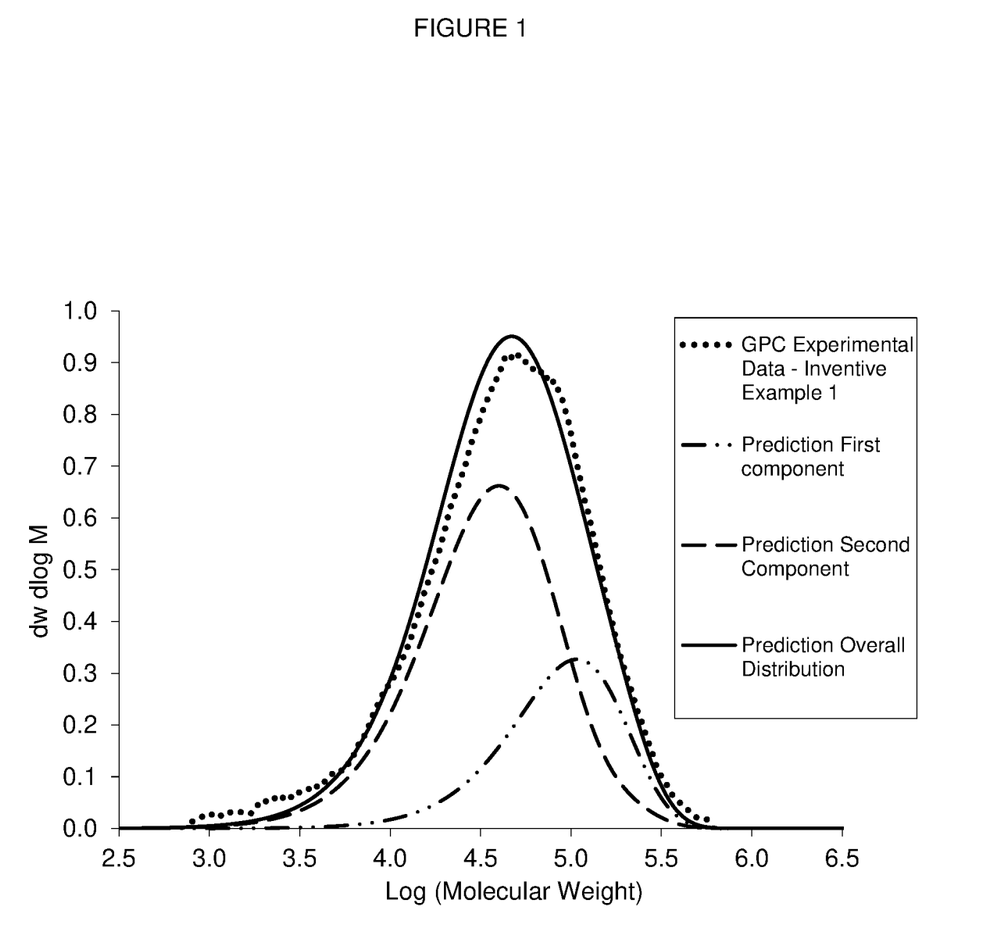
FIG. 1 shows the deconvolution of Example 1. The experimentally measured GPC chromatogram was deconvoluted into a first and a second ethylene interpolymer based on kinetic model predictions.
Figure 2:
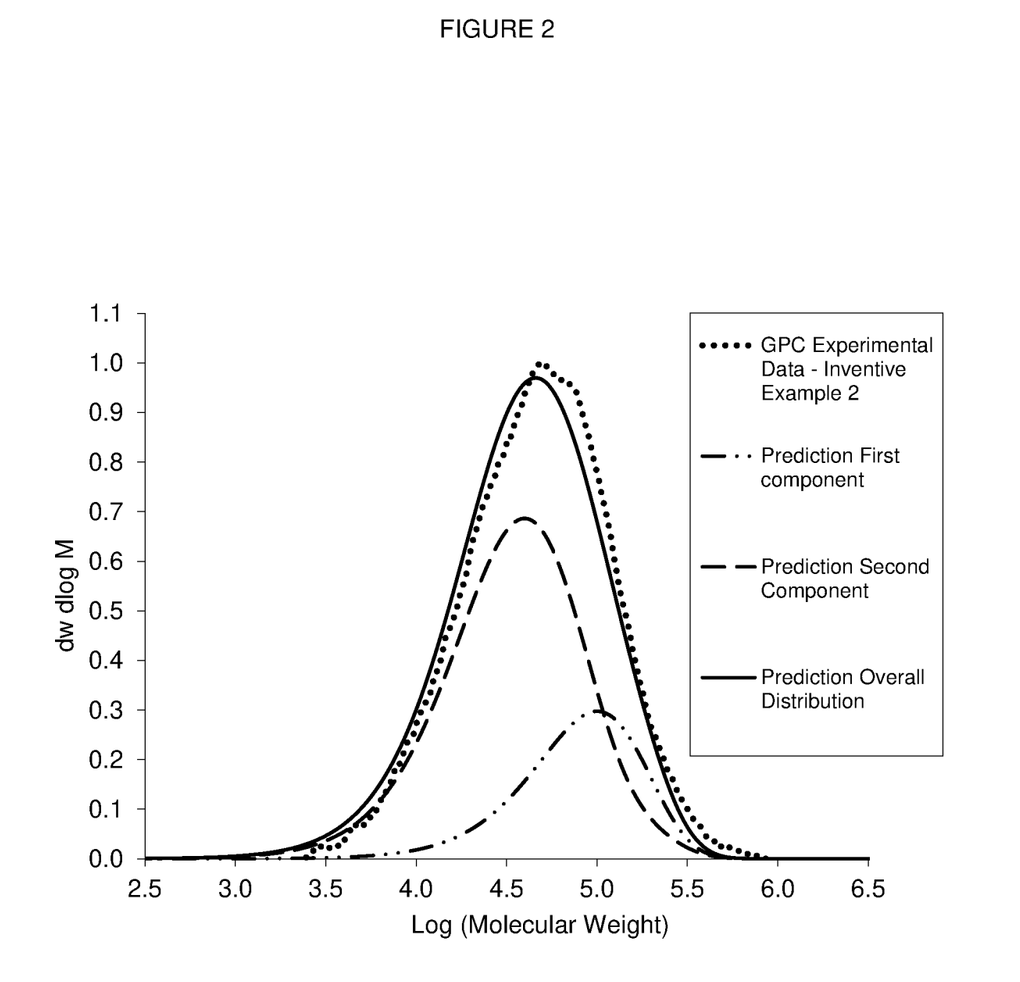
FIG. 2 shows the deconvolution of Example 2. The experimentally measured GPC chromatogram was deconvoluted into a first and a second ethylene interpolymer (based on kinetic model predictions.
Figure 3:
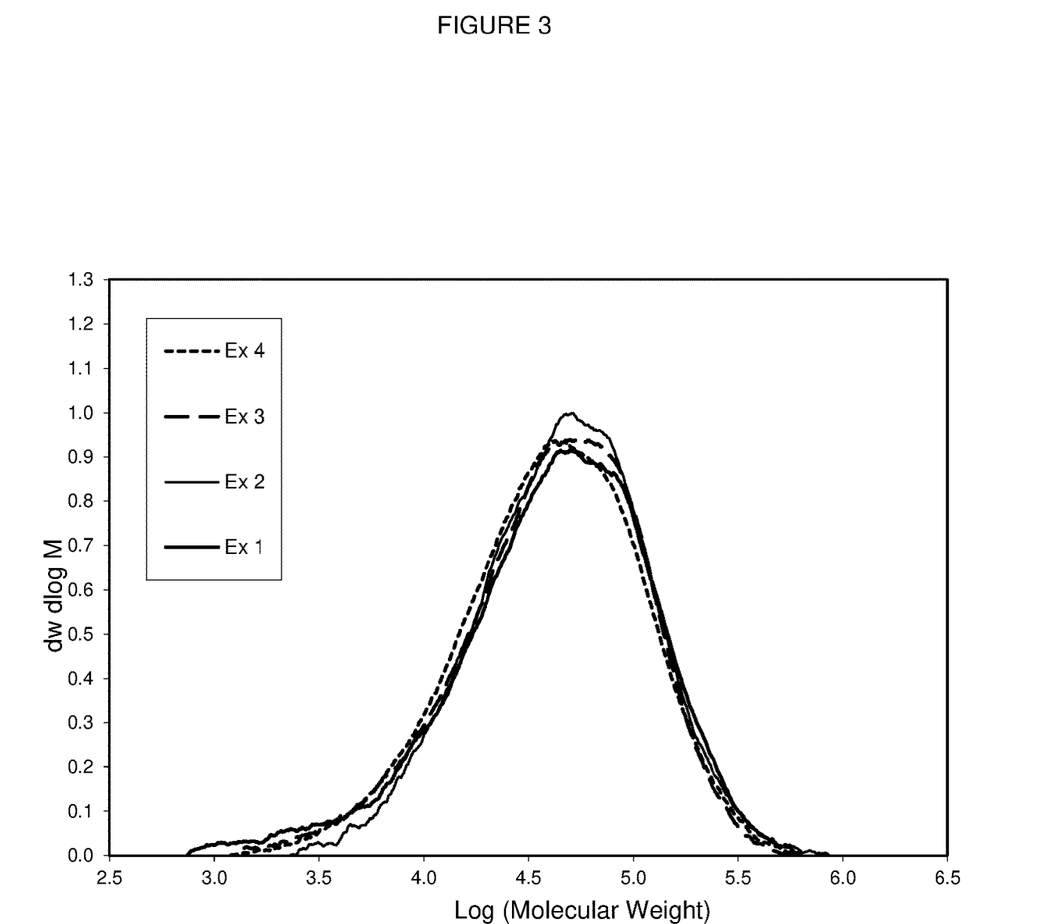
FIG. 3 is a plot of the molecular weight distribution obtained by gel permeation chromatograph (GPC) of resin of examples 1, 2, 3 and 4.
Figure 4:
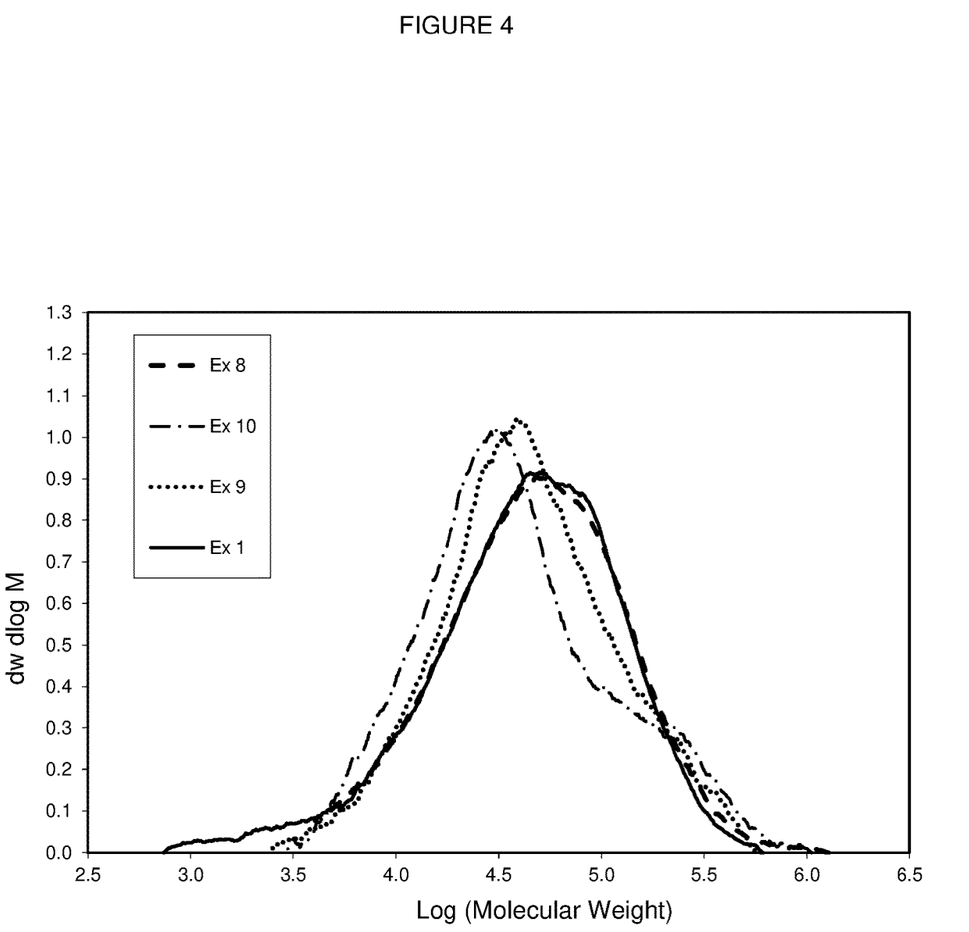
FIG. 4 is a plot of the molecular weight distribution obtained by gel permeation chromatograph (GPC) of resin of examples 1, 8, 9 and 10.
Figure 5:
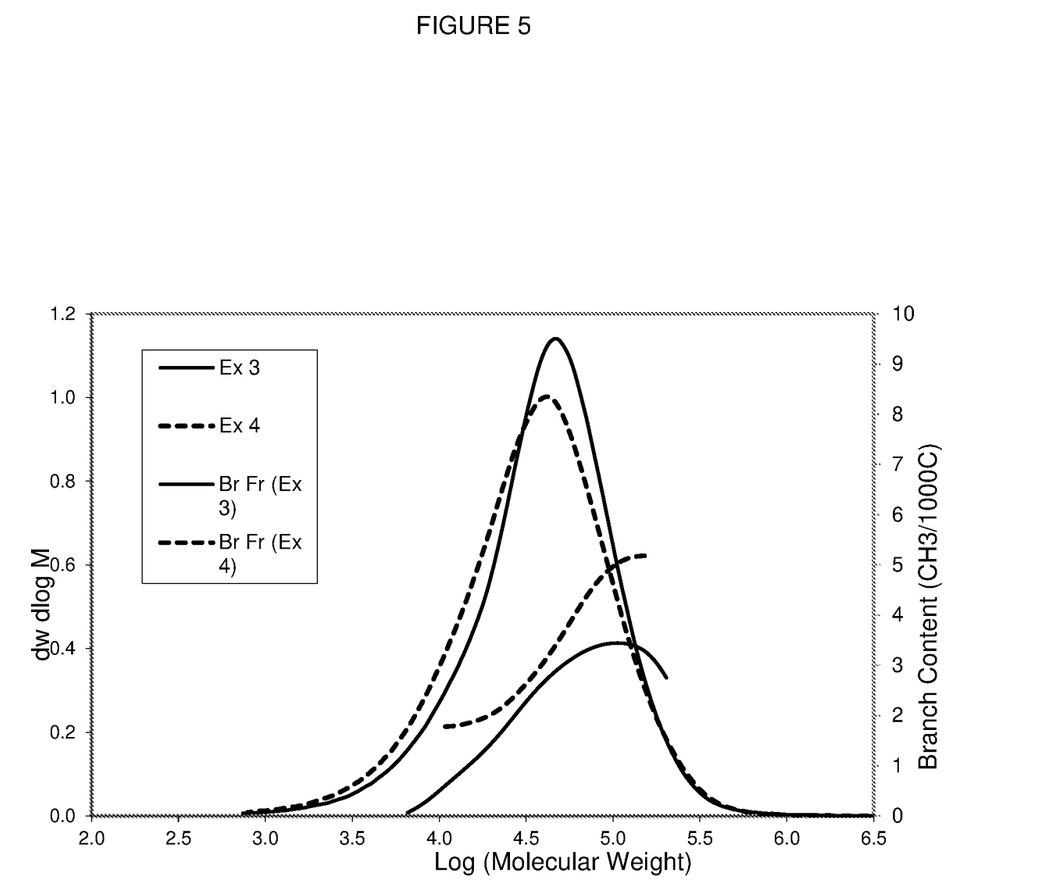
FIG. 5 is a plot of the molecular weight distribution obtained by gel permeation chromatograph (GPC), and the short chain branching distribution determined from GPC-FTIR of resin of examples 3 and 4.
Figure 6:
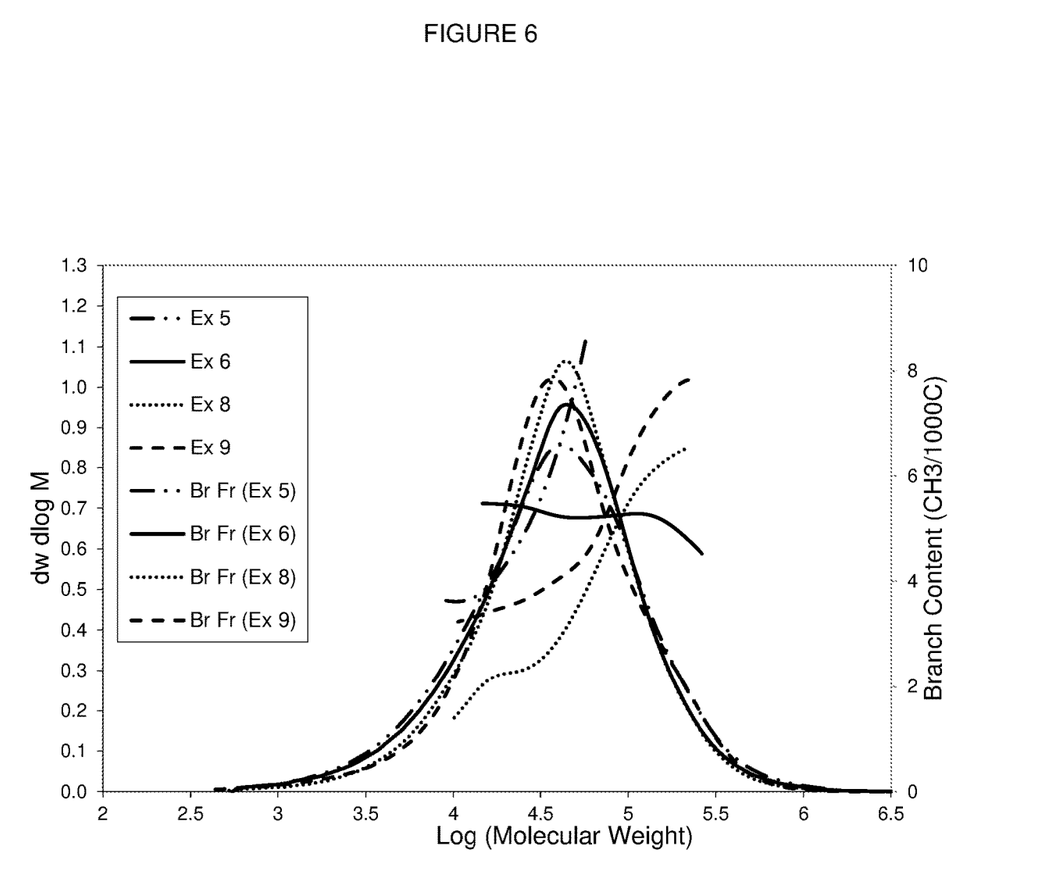
FIG. 6 is a plot of the molecular weight distribution obtained by gel permeation chromatograph (GPC), and the short chain branching distribution determined from GPC-FTIR of resin of examples 5, 6, 8 and 9.

The compositions of the present disclosure are bimodal polyethylene and can be de-convoluted into two distinct components. Typically, this is demonstrated by the presence of a "shoulder" at the right side of a gel permeation chromatography (GPC) curve (FIG. 1). In the present case, there is a small shoulder to the right side of the GPC curve as shown in FIG. 2 indicating a small amount of a higher molecular weight low density component.

The high molecular weight component has a melt index of from 0.4 to 5 and is present in an amount from about 10 to about 70 weight % of the entire composition, preferably from about 15 to about 50 weight %. The lower molecular weight component is present in corresponding amounts from about 90 to about 30 weight %, of the entire composition, preferably from about 85 to about 50 weight % based on the weight of the entire composition.

In an embodiment, the higher molecular weight component has a weight average molecular weight (Mw) from about 70,000 to about 150,000, as determined using gel permeation chromatography (GPC). The higher molecular weight component has a polydispersity (Mw/Mn: weight average molecular weight/number average molecular weight)) of 1.8 to 3.0. The melt index, I2, of the overall composition is from about 4 to 10.

The higher molecular weight component has a lower density than the lower molecular weight component. The density of the higher molecular weight component in the composition may range from about 0.920 to about 0.950 g/cm$^3$. The density of the component, or that of any other component or the total composition, is a function of the degree of comonomer incorporation. The higher molecular weight component preferably does not have any long chain branching.

The lower molecular weight component has a melt index of from 4 to 1,500. In an embodiment, the Mw is from about 28,000 to about 72,000, as determined using gel permeation chromatography (GPC) and a polydispersity (Mw/Mn) of from 2.3 to 5.0.

The lower molecular weight component has a density that is 0.010 to 0.030 g/cc higher than the higher molecular weight component.

The catalysts used to produce the bimodal polyethylene compositions preferably do not produce long chain branching.

The overall properties of the bimodal polyethylene compositions include the following:
density from about 0.940 to about 0.957 g/cm$^3$;
melt index under a load of 2.16 kg (I2) at a temperature of 190° C. as determined by ASTM 1238 from about 4 to about 10; and a relative elasticity G'/G", when measured at 190 and at 0.05 rad/second, of less than 0.03 (especially from 0.01 to 0.03).

In an embodiment, the overall polyethylene compositions have a comonomer content of less than 1.2 mole % as measured by Fourier Transform Infra Red (FTIR).

The polymer may be made using a solution polymerization technique. In the solution polymerization of ethylene with one or more comonomers, non-limiting examples of comonomers include $C_{3-8}$ α-olefins; in some cases, 1-hexene or 1-octene are preferred, or; in other cases, 1-octene is preferred. Monomers are typically dissolved in an inert hydrocarbon solvent, typically, a $C_{5-12}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent that is commercially available is "Isopar E" ($C_{8-12}$ aliphatic solvent, Exxon Chemical Co.).

Catalyst and activators are also dissolved in the solvent or suspended in a diluent miscible with the solvent at reaction conditions.

Catalysts

In an embodiment, the single site catalyst is a compound of the formula wherein M is selected from the group consisting of Ti, Zr and Hf; PI is a phosphinimine ligand of the formula:

wherein each $R^{21}$ is independently selected from the group consisting of a hydrogen atom; a halogen atom; hydrocarbyl radicals, typically, $C_{1-10}$, which are unsubstituted by or further substituted by a halogen atom; $C_{1-8}$ alkoxy radicals; $C_{6-10}$ aryl or aryloxy radicals; amido radicals; silyl radicals of the formula:

wherein each $R_{22}$ is independently selected from the group consisting of hydrogen, a $C_{1-8}$ alkyl or alkoxy radical and $C_{6-10}$ aryl or aryloxy radicals; and a germanyl radical of the formula:

wherein $R_{22}$ is as defined above; L is a monoanionic cyclopentadienyl-type ligand independently selected from the group consisting of cyclopentadienyl-type ligands, Y is independently selected from the group consisting of activatable ligands; m is 1 or 2; n is 0 or 1; p is an integer and the sum of m+n+p equals the valence state of M.

Suitable phosphinimines are those in which each $R^{21}$ is a hydrocarbyl radical, preferably a $C_{1-6}$ hydrocarbyl radical, most preferably a $C_{1-4}$ hydrocarbyl radical.

The term "cyclopentadienyl" refers to a 5-member carbon ring having delocalized bonding within the ring and, typically, being bound to the active catalyst site, generally, a group 4 metal (M) through eta-5-bonds. The cyclopentadienyl ligand may be unsubstituted or up to fully substituted with one or more substituents selected from the group consisting of $C_{1-10}$ hydrocarbyl radicals which are unsubstituted or further substituted by one or more substituents selected from the group consisting of a halogen atom and a $C_{1-4}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, $C_{6-10}$ aryl or aryloxy radicals; and germanyl radicals of the formula Ge—$(R)_3$ wherein R is as defined above.

The cyclopentadienyl-type ligand may be selected from the group consisting of a cyclopentadienyl radical, an indenyl radical and a fluorenyl radical, which radicals are unsubstituted or up to fully substituted by one or more substituents selected from the group consisting of a fluorine atom, a chlorine atom; $C_{1-4}$ alkyl radicals; and a phenyl or benzyl radical which is unsubstituted or substituted by one or more fluorine atoms.

Activatable ligands Y may be selected from the group consisting of a halogen atom, $C_{1-4}$ alkyl radicals, $C_{6-20}$ aryl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals. In some cases, Y is selected from the group consisting of a chlorine atom, a methyl radical, an ethyl radical and a benzyl radical.

Suitable phosphinimine catalysts are Group 4 organometallic complexes which contain one phosphinimine ligand (as described above) and one cyclopentadienyl-type (L) ligand and two activatable ligands. The catalysts are not bridged.

Activators

The activators for the catalyst are typically selected from the group consisting of aluminoxanes and ionic activators.

Alumoxanes (Also Known as "Aluminoxanes"

Suitable alumoxane may be of the formula:$(R^4)_2AlO(R^4AlO)_mAl(R^4)_2$ wherein each $R^4$ is independently selected from the group consisting of $C_{1-20}$ hydrocarbyl radicals and m is from 0 to 50, preferably, $R^4$ is a $C_{1-4}$ alkyl radical and m is from 5 to 30. A non-limiting example of a suitable alumoxane is methylalumoxane (or "MAO") in which each R is methyl.

Alumoxanes are well known as cocatalysts, particularly for metallocene-type catalysts. Alumoxanes are also readily available articles of commerce.

The use of an alumoxane cocatalyst generally requires a molar ratio of aluminum to the transition metal in the catalyst from about 20:1 to about 1000:1; or, in other cases, from about 50:1 to about 250:1.

Commercially available MAO typically contains free aluminum alkyl (e.g., trimethylaluminum or "TMA") which may reduce catalyst activity and/or broaden the molecular weight distribution of the polymer. If a narrow molecular weight distribution polymer is required, it is preferred to treat such commercially available MAO with an additive which is capable of reacting with the TMA; non-limiting examples of suitable additives include alcohols or hindered phenols.

"Ionic Activators" Cocatalysts

So-called "ionic activators" are also well known for metallocene catalysts. See, for example, U.S. Pat. No. 5,198,401 (Hlatky and Turner) and U.S. Pat. No. 5,132,380 (Stevens and Neithamer).

While not wishing to be bound by any theory, it is thought by those skilled in the art that "ionic activators" initially cause the abstraction of one or more of the activatable ligands in a manner which ionizes the catalyst into a cation, then provides a bulky, labile, non-coordinating anion which stabilizes the catalyst in a cationic form. The bulky, non-coordinating anion permits olefin polymerization to proceed at the cationic catalyst center (presumably, because the non-coordinating anion is sufficiently labile to be displaced by monomer which coordinates to the catalyst. Non-limiting examples of ionic activators are boron-containing ionic activators such as:

compounds of the formula $[R^5]^+[B(R^7)_4]^-$ wherein B is a boron atom, $R^5$ is an aromatic hydrocarbyl (e.g., triphenyl methyl cation) and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical; and compounds of the formula $[(R^8)_tZH]+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and compounds of the formula $B(R^7)_3$ wherein $R^7$ is as defined above.

In the above compounds, preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include: triethylammonium tetra(phenyl) boron; tripropylammonium tetra(phenyl) boron; tri (n-butyl) ammonium tetra(phenyl) boron; trimethylammonium tetra(p-tolyl) boron; trimethylammonium tetra (o-tolyl) boron; tributylammonium tetra(pentafluorophenyl) boron; tripropylammonium tetra(o,p-dimethylphenyl) boron; tributylammonium tetra(m,m-dimethylphenyl) boron; tributylammonium tetra(p-trifluoromethylphenyl) boron; tributylammonium tetra(pentafluorophenyl) boron; tri (n-butyl) ammonium tetra(o-tolyl) boron; N,N-dimethylanilinium tetra(phenyl) boron; N,N-diethylanilinium tetra (phenyl) boron; N,N-diethylanilinium tetra(phenyl) n-butylboron; N,N-2,4,6-pentamethylanilinium tetra(phenyl) boron; di-(isopropyl) ammonium tetra(pentafluorophenyl) boron; dicyclohexylammonium tetra(phenyl) boron; triphenylphosphonium tetra(phenyl) boron; tri(methylphenyl) phosphonium tetra(phenyl) boron; tri (dimethylphenyl) phosphonium tetra(phenyl) boron; tropillium tetrakispentafluorophenyl borate; triphenylmethylium tetrakispentafluorophenyl borate; benzene (diazonium)tetrakispentafluorophenyl borate; tropillium phenyltrispentafluorophenyl borate; triphenylmethylium phenyltrispentafluorophenyl borate; benzene (diazonium) phenyltrispentafluorophenyl borate; tropillium tetrakis(2,3, 5,6-tetrafluorophenyl) borate; triphenylmethylium tetrakis (2,3,5,6-tetrafluorophenyl) borate; benzene (diazonium) tetrakis(3,4,5-trifluorophenyl) borate; tropillium tetrakis(3, 4,5-trifluorophenyl) borate; benzene (diazonium)tetrakis(3, 4,5-trifluorophenyl) borate; tropillium tetrakis(1,2,2-trifluoroethenyl) borate; triphenylmethylium tetrakis(1,2,2-trifluoroethenyl) borate; benzene (diazonium)tetrakis(1,2,2-trifluoroethenyl) borate; tropillium tetrakis(2,3,4,5-tetrafluorophenyl) borate; triphenylmethylium tetrakis(2,3, 4,5-tetrafluorophenyl) borate; and benzene (diazonium) tetrakis(2,3,4,5-tetrafluorophenyl) borate.

Readily commercially available ionic activators include: N,N-dimethylaniliniumtetrakispentafluorophenyl borate; triphenylmethylium tetrakispentafluorophenyl borate; and trispentafluorophenyl borane.

The ionic activator may be use at about molar equivalents of boron to group IV metal in the catalyst. Suitable molar ratios of group IV metal from the catalyst to boron may range from about 1:1 to about 3:1, in other cases, from about 1:1 to about 1:2.

In some instances, the ionic activator may be used in combination with an alkylating activator (which may also serve as a scavenger). The ionic activator may be selected from the group consisting of $(R^3)_pMgX_{2-p}$ wherein X is a halide and each $R^3$ is independently selected from the group consisting of $C_{1-10}$ alkyl radicals and p is 1 or 2; $R^3Li$ wherein $R^3$ is as defined above; $(R^3)_qZnX_{2-q}$ wherein $R^3$ is as defined above, X is halogen and q is 1 or 2; $(R^3)_sAlX_{3-s}$ wherein $R^3$ is as defined above, X is halogen and s is an integer from 1 to 3. Preferably, in the above compounds, $R^3$ is a $C_{1-4}$ alkyl radical, and X is chlorine. Commercially available compounds include triethyl aluminum (TEAL), diethyl aluminum chloride (DEAC), dibutyl magnesium ((Bu) 2 Mg), and butyl ethyl magnesium (BuEtMg or BuMgEt).

If the phosphinimine catalyst is activated with a combination of ionic activators (e.g., boron compounds) and alkylating agent, the molar ratio of group IV metal from the catalyst:metalloid (boron) from the ionic activator:metal from the alkylating agent may range from about 1:1:1 to about 1:3:10, in other cases from about 1:1.3:5 to about 1:1.5:3.

Second Catalyst

In an embodiment, a ZN catalyst is used in the second reactor. Any ZN catalyst system that performs well for the solution polymerization of ethylene (optionally, with one or more alpha olefins comonomers, especially 1-butene; 1-hexene; or 1-octene) is potentially suitable. The ZN catalysts disclosed in U.S. Pat. Nos. 10,023,706 and 9,695,309 are specific (but non limiting) examples.

Polymerization Process

The temperature of the reactor(s) in a high temperature solution process is from about 80° C. to about 300° C., in other cases, from about 120° C. to 250° C. The upper temperature limit will be influenced by considerations that are well known to those skilled in the art, such as a desire to maximize operating temperature (so as to reduce solution viscosity), while still maintaining good polymer properties (as increased polymerization temperatures generally reduce the molecular weight of the polymer). In general, the upper polymerization temperature may be between about 200 and about 300° C. A process that uses two reactors may be conducted at two temperatures with the temperature of the second reactor being higher than that of the first reactor. The most preferred reaction process is a "medium pressure process", meaning that the pressure in the reactor(s) is preferably less than about 6,000 psi (about 42,000 kiloPascals or kPa). Preferred pressures are from about 10,000 to about 40,000 kPa (1450-5800 psi), most preferably from about 14,000 to about 22,000 kPa (2,000 psi to 3,000 psi).

In some reaction schemes, the pressure in the reactor system should be high enough to maintain the polymerization solution as a single phase solution and to provide the necessary upstream pressure to feed the polymer solution from the reactor system through a heat exchanger system and to a devolatilization system. Other systems permit the solvent to separate into a polymer rich and polymer lean stream to facilitate polymer separation.

The solution polymerization process may be conducted in a stirred "reactor system" comprising one or more stirred tank reactors or in one or more loop reactors or in a mixed loop and stirred tank reactor system. The reactors may be in tandem or parallel operation. In a dual tandem reactor system, the first polymerization reactor preferably operates at lower temperature. The residence time in each reactor will depend on the design and the capacity of the reactor. Generally, the reactors should be operated under conditions to achieve a thorough mixing of the reactants. In addition, it is preferred that from about 20 to about 60 weight % of the final polymer is polymerized in the first reactor, with the balance being polymerized in the second reactor.

A useful solution polymerization process uses at least two polymerization reactors in series. The polymerization temperature in the first reactor is from about 80° C. to about 180° C. (in other cases, from about 120° C. to 160° C.) and the second reactor is typically operated at a higher temperature (up to about 220° C.). The most preferred reaction process is a "medium pressure process", meaning that the pressure in each reactor is preferably less than about 6,000 psi (about 42,000 kilopascals or kPa), most preferably, from about 2,000 psi to about 3,000 psi (about 14,000 to about 22,000 kPa).

EXAMPLES

Test Methods

Mn, Mw and Mz (g/mol) were determined by high temperature Gel Permeation Chromatography (GPC) with differential refractive index detection using universal calibration (ASTM-6467). The molecular weight distribution (MWD), also known to those skilled in the art as "polydispersity" or "polydispersity index" is the ratio of the weight average molecular weight (Mw) over the number average molecular weight (Mn).

GPC in combination with Fourier Transform Infra Red spectrography ("GPC-FTIR") was used to determine the comonomer content as a function of molecular weight. After separation of the polymer by GPC, an on-line FTIR measures the concentration of the polymer and methyl end groups. Methyl end groups are used in the branch frequency calculations. Conventional calibration allows for the calculation of a molecular weight distribution.

Mathematical de-convolutions were performed to estimate the relative amount of polymer, molecular weight, and comonomer content of the component made in each reactor.

The short chain branch frequency (SCB per 1000 carbon atoms) of copolymer samples was determined by Fourier Transform Infrared Spectroscopy (FTIR) as per ASTM D6645-01. A Thermo-Nicolet 750 *Magna*—IR Spectrophotometer was used for the measurement. FTIR was also used to determine internal, side chain and terminal levels of unsaturation (also referred to as "unsats", for convenience).

Comonomer content can also be measured using carbon 13 nuclear magnetic resonance (NMR) techniques as discussed in Randall Rev. Macromol. Chem. Phys., $C_{29}$ (2&3), p. 285; U.S. Pat. No. 5,292,845 and WO 2005/121239.

Information about the composition distribution was also obtained from temperature raising elution fractionation (TREF). A polymer sample (80 to 100 mg) was introduced into the reactor vessel of the Polymer Char crystal-TREF unit. The reactor vessel was filled with 35 ml 1,2,4-trichlorobenzene (TCB), heated to the desired dissolution temperature (e.g. 150° C.) for 2 hours. The solution (1.5 ml) was then loaded into the TREF column filled with stainless steel beads. After allowed to equilibrate at a given stabilization temperature (e.g. 110° C.) for 45 minutes, the polymer solution was allowed to crystallize with a temperature drop from the stabilization temperature to 30° C. (0.09° C./minute). After equilibrating at 30° C. for 30 minutes, the crystallized sample was eluted with TCB (0.75 mL/minute) with a temperature ramp from 30° C. to the stabilization temperature (0.25° C./minute). The TREF column was cleaned at the end of the run for 30 minutes at the dissolution temperature. The data were processed using Polymer Char software, Excel spreadsheet and TREF software developed in-house.

CDBI is defined to be the percent of polymer whose composition is within 50% of the median comonomer composition. It is calculated from the composition distribution cure and the normalized cumulative integral of the composition distribution curve, as illustrated in U.S. Pat. No. 5,376,439.

Polyethylene composition density (g/cm$^3$) was measured according to ASTM D792.

Melt indexes I2, I6 and I21 for the polyethylene composition were measured according to ASTM D1238. For clarity: I2 is measured at 190° C. with a 2.16 kilogram load; $I_{21}$ is measured at the same temperature with a 21.6 kilogram load.

The density and melt index of the first and second ethylene polymers that comprise the polyethylene composition were determined based on composition models. The following equations were used to calculate the density and melt index $I_2$ (Reference U.S. Pat. No. 8,022,143 B2, by Wang, assigned to NOVA Chemicals and published Sep. 20, 2011):

$$\text{Density} = 0.979863 - 5.95808 \times 10^{-3} \left( \frac{SCB}{1000\,C} \right)^{0.65} - 3.83133 \times 10^{-4} [\log_{10}(M_n)]^3 - 5.77986 \times 10^{-6} (M_w/M_n)^3 + 5.57395 \times 10^{-3} (M_z/M_w)^{0.25}$$

$$\log_{10}(\text{Melt Index } I_2) = 22.326528 + 3.467 \times 10^{-3} [\log_{10}(M_n)]^3 - 4.322582 [\log_{10}(M_w)] - 1.80061 \times 10^{-1} [\log_{10}(M_z)]^2 + 2.6478 \times 10^{-2} [\log_{10}(M_z)]^3$$

where Mn, Mw, Mz, and SCB/1000C are the de-convoluted values of the individual ethylene polymer components, as obtained from the results of the de-convolution described above.

Primary melting peak (C), heat of fusion (J/g) and crystallinity (%) were determined using differential scanning calorimetry (DSC) as follows: the instrument was first calibrated with indium; after which a polymer specimen is equilibrated at 0° C.; the temperature was increased to 200° C. at a heating rate of 10° C./min; the melt was then kept at that temperature for five minutes; the melt was then cooled to 0° C. at a cooling rate of 10° C./min and kept at 0° C. for five minutes; the specimen was heated a second time to 200°

C. at a heating rate of 10° C./min. The melting peak (Tm), heat of fusion and crystallinity reported are calculated based on the second heating.

Rheology—Melt Strength by Capillary Rheometry

Melted polymer is extruded through a capillary die under constant extrusion rate. The extruded strand is drawn at increasing haul-off speed. The force of drawing the melt is continuously monitored, and the maximum steady value of the force level at or prior to the rupture of the filament is defined as the melt strength. The ratio of the velocity of draw to the extrusion velocity at die exit is defined as the stretch ratio.

The melt strength is measured on a capillary rheometer (barrel diameter=15 mm) with a flat die of 2-mm Diameter, L/D ratio 10:1 at 190° C. Pressure Transducer: 10,000 psi (68.95 MPa). Piston Speed: 5.33 mm/min. Haul-off Angle: 52°. Haul-off incremental speed: 50-80 m/min2 or 65±15 m/min2. A polymer melt is extruded through a capillary die under a constant rate and then the polymer strand is drawn at an increasing haul-off speed until it ruptures. The maximum steady value of the force in the plateau region of a force versus time curve is defined as the melt strength for the polymer. The melt stretch ratio is defined as the ratio of the velocity at pulley over the velocity at the exit of the die.

Rheology—DMA

Rheological properties were determined using frequency sweep test measurements on a rotational rheometer.

A sample (in the form of a compression molded disk) is placed in an environmental test chamber between two test geometries; the upper geometry attached up the drive shaft, and the lower geometry attached to a base. The analysis is carried out over a range of frequencies, at a fixed strain and a constant temperature. The rheometer was a commercially available instrument (sold under the name DHR-3 by TA Instruments).

This test technique provides an opportunity to study the various characteristics of a polymer melt where the elastic and viscous modulus (G' and G"), complex viscosity, complex modulus (G*), loss tangent, dynamic viscosity, out of phase component of the complex modulus, phase angle and other rheological properties as a function of oscillation frequency are generated to provide information on the rheological behavior in correlation with the molecular architecture.

The rheological parameters derived from the test data are: cross-over frequency, cross-over modulus, three Ellis Model constants: Ellis constant $C_1$ (or zero shear viscosity), Ellis constant C2 (or reciprocal of characteristic relaxation time), Ellis constant C3 (or power law exponent), Dow Rheology Index (DRI), Relaxation Spectrum Index (RSI), Melt Elasticity Index (G'@G"=500 Pa), Viscosity Ratio, Cole-Cole and VGP plots.

The relative elasticity, defined as the ratio of G' over G" at a frequency of 0.05 rad/s. Without wishing to be bound by theory, a relatively low relative elasticity has been observed to correlate with powder densification during the rotational molding process.

Izod Impact testing was conducted in accordance with ASTM D256-10E1.

Tensile impact testing was conducted in accordance with ASTM D1822-13.

Rotomolded parts were prepared in a rotational molding machine sold under the tradename Rotospeed RS3-160 by Ferry Industries Inc. The machine has two arms which rotate about a central axis within an enclosed oven. The arms are fitted with plates which rotate on an axis that is roughly perpendicular to the axis of rotation of the arm. Each arm is fitted with six cast aluminum molds that produce plastic cubes having dimensions of 12.5 inches (31.8 cm)×12.5 inches×12.5 inches. The arm rotation was set to about 8 revolutions per minute (rpm) and the plate rotation was set to about 2 rpm. These molds produce parts having a nominal thickness of about 0.25 inches (0.64 cm) when initially filled with a standard charge of about 3.7 kg of polyethylene resin in powder form (35 US mesh size). The temperature within the enclosed oven was maintained at a temperature of 560° F. (293° C.). The molds and their content were heated for a specified period of time, until full powder densification is achieved. The molds were subsequently cooled in a controlled environment prior to removing the parts. Specimens were collected from the molded parts for density and color measurements The ARM impact test was performed in accordance with ASTM D5628 at a test temperature of −40° C.

Test specimens to be impacted are to be from a rotationally molded part. Test specimens should be conditioned to reach uniform chilling of the specimen cross-section to not less than −40° F.±3.5° F. (−40° C.±2° C.).

The impact testing technique on rotationally molded part is commonly called the Bruceton Staircase Method or the Up-and-Down Method. The procedure establishes the height of a specific dart that will cause 50% of the specimens to fail. Percentage ductility represent the percentage of failures that showed ductile characteristics. Samples are impact tested using the drop weight impact tester. If the sample did not fail at a given height/weight, either the height or weight is increased incrementally until failure occurs. Once failure has occurred, the height/weight is decreased by the same increment and the process is repeated until all samples are utilized. The falling dart should impact the surface of the part that was in contact with the mold when it was molded. For polyethylene, a ductile failure is the failure desired mode that generally occurs on properly processed samples. A brittle failure or failure by shattering, generally indicate that the optimum properties have not been obtained by the processing parameters used.

Ductile: signified by penetration of the dart though the specimen leaving a hole with stringy fibers at point of failure rather than cracking outwardly from point of failure. The area under the dart has elongated and thinned at the point of failure.

Brittle: signified by the part physically coming apart or cracking at the point of impact. Sample has no or very little elongation. As used herein, the term "ductility index" refers to the percentage of parts in a multi-part test that exhibit ductile failure. For example, if 10 parts are tested and 8 of them exhibit ductile failure (i.e. 80% of the parts exhibited ductile failure), then the test result is reported as having a ductility index of 80%.

The Resin

Bimodal polyethylene compositions were prepared at a dual reactor pilot plant. In this dual reactor process, the content of the first reactor flows into the second reactor, both of which are well mixed. The process operates using continuous feed streams. The catalyst (cyclopentadienyl tri (tertiary butyl)phosphinimine titanium dichloride) [note: this catalyst is referred to as "PI-cat" in the Tables that describe experimental polymerizations] with activator was fed to the first reactor and a ZN catalyst to the second. The overall production rate was about 90 kg/hr.

The polymerization conditions are provided in Table 1.

The polymer compositions prepared at the pilot plant were stabilized using a conventional additive package for rotational molding applications prior to carrying out plaque testing trials. Rotomolding compositions typically contain an additive package to protect the polyethylene from degradation during the processing process and to subsequently protect the rotomolded part from exposure to the atmosphere. The compositions of this disclosure are not intended to be limited to the use of any specific additive package. The inventive compositions shown in the examples contained the following additives (all amounts shown in parts per million by weight relative to the weight of the polyethylene): 500 ppm of hindered phenol (CAS Registry number 2082-79-3); 550 ppm of phosphite (CAS Registry number 31570 Apr. 4); 450 ppm of diphosphite (CAS Registry number 154862-43-8); 250 ppm of hydroxylamine (CAS Registry number 143925-92-2); 750 ppm of Hindered Amine Light Stabilizer (HALS)-1 (CAS Registry number 70624-18-9); 750 ppm of HALS-2 (CAS Registry number 65447-77-0); and 750 ppm of Zinc Oxide.

Table 2 discloses GPC deconvolution results, wherein Examples 1 and 2 were mathematically deconvoluted into a $1^{st}$ ethylene polymer (synthesized in reactor 1) and a $2^{nd}$ ethylene polymer (synthesized in reactor 2). The density and melt index of the $1^{st}$ and $2^{nd}$ ethylene polymers were calculated based on fundamental kinetic models (with kinetic constants specific for each catalyst formulation) as well as feed and reactor conditions. The equations used to calculate densities and melt indices were descried above (and in U.S. Pat. No. 8,022,143). The simulation was based on the configuration of the dual reactor solution pilot plant described above. The first ethylene interpolymer was fit to a distribution based on a fundamental kinetic model that describes the behavior of the single site catalyst formulation. The second ethylene interpolymer was fit to a distribution based on a fundamental kinetic model that describes the behavior of the heterogeneous catalyst formulation. As shown in Table 2, in the case of Example 1, the $1^{st}$ plus the $2^{nd}$ ethylene polymer comprise 88 wt % of Example 1; the remainder of Example 1 (12 wt %) was synthesized in the tube linking reactor 1 and 2 (<3 wt %, having the same composition as the $1^{st}$ ethylene polymer) and the tube following reactor 2 (<10 wt %, having the same composition as the $2^{nd}$ ethylene polymer) prior to adding catalyst deactivator.

The properties of pressed plaques of the rotomolding resins disclosed herein (Examples 1 through 4) are shown in Table 3a; comparative resins are shown in Table 3b (Comparative Examples 5 through 8). The properties of rotomolded parts as well as pressed plaques made from the polyethylene compositions disclosed herein are disclosed in Table 4a; and comparatives in Table 4b and 4c. Resins with higher density usually do not perform well in rotomolded applications that also require good toughness. Examples 1 and 2 show superior performance over comparative examples with a combination of high density, good toughness (ductility >50%) and high mean failure energy at optimal molding conditions. Without wishing to be bound be theory, a high density translates in higher stiffness and allow for the use of less material in order to achieve comparable structural strength in a molded part.

TABLE 1

Manufacturing Conditions

|  | Example 1 | Example 2 | Example 3 | Example 4 |
|---|---|---|---|---|
| Catalyst in R1 | PI-cat | PI-cat | PI-cat | PI-cat |
| Catalyst in R2 | ZN | ZN | ZN | ZN |
| Ethylene split between first reactor (R1), second reactor (R2) and third reactor (R3) | 0.29/71 | 26/74 | 0.30/0.70/0 |  |
| Octene split between first Reactor (R1) and second reactor (R2), and third reactor (R3) | 1/0 | 1/0 | 1/0/0 |  |
| Octene to ethylene ratio in fresh feed | 0.042 | 0.080 | 0.110 |  |
| Hydrogen in reactor 1 (ppm) | 2.7 | 2.4 | 2.7 |  |
| Hydrogen in reactor 2 (ppm) | 30.0 | 30.0 | 17.7 |  |
| Reactor 1 temperature (° C.) | 139 | 139 | 140 |  |
| Reactor 2 temperature (° C.) | 186 | 188 | 223 |  |
| Conversion in reactor 1 (%) | 92.1 | 92.0 | 91.7 |  |
| Conversion in reactor 2 (%) | 85.0 | 85.0 | 81.7 |  |
| Catalyst feed in reactor 1-(ppm of Ti) | 0.14 | 0.22 | 0.39 | 0.59 |
| SSC-Al/Group 3 metal in reactor 1 (mol/mol) | 100 | 100 | 65 | 65 |
| SSC-B/Group 4 metal in reactor 1 (mol/mol) | 1.3 | 1.3 | 1.2 | 1.2 |
| Catalyst feed in reactor 2-PI (ppm of Ti) |  |  |  |  |
| Catalyst feed in reactor 2-(ppm of Ti) | 2.4 | 2.9 | 6.2 | 8.5 |
| Catalyst feed in reactor 2-Tert-butyl chloride/Butyl(ethyl) magnesium (mol/mol) | 2.0 | 2.0 | 1.9 | 1.9 |
| Catalyst feed in reactor 2-Diethylaluminium ethoxide/Titanium tetrachloride (mol/mol) | 1.4 | 1.4 | 1.3 | 1.3 |
| Catalyst feed in reactor 2-Triethylaluminium/Titanium tetrachloride (mol/mol) | 0.4 | 0.4 | 0.3 | 0.3 |
| Catalyst feed in reactor 2-Butyl(ethyl)magnesium/Titanium tetrachloride (mol/mol) | 7.0 | 7.0 | 7.0 | 7.0 |
| Polyethylene production rate (kg/h) | 69.1 | 70.1 | 103.2 |  |

TABLE 1

CONTINUED
Manufacturing Conditions

|  | Comparative Example 8 | Comparative Example 9 | Comparative Example 10 |
|---|---|---|---|
| Catalyst in R1 | PI-cat | PI-cat | PI-cat |
| Catalyst in R2 | ZN | PI-cat | PI-cat |
| Ethylene split between first reactor (R1), second reactor (R2) and third reactor (R3) | 0.25/0.75/0 | 0.30/0.70/0 |  |
| Octene split between first Reactor (R1) and second reactor (R2), and third reactor (R3) | 1/0/0 | 1/0/0 |  |
| Octene to ethylene ratio in fresh feed | 0.135 | 0.144 |  |
| Hydrogen in reactor 1 (ppm) | 1.2 | 0.9 |  |
| Hydrogen in reactor 2 (ppm) | 24.3 | 2.9 |  |
| Reactor 1 temperature (° C.) | 138 | 138 |  |
| Reactor 2 temperature (° C.) | 212 | 210 |  |
| Conversion in reactor 1 (%) | 91.5 | 89.6 |  |
| Conversion in reactor 2 (%) | 91.9 | 88.0 |  |
| Catalyst feed in reactor 1-(ppm of Ti) | 0.21 | 0.14 |  |
| SSC-Al/Group 3 metal in reactor 1 (mol/mol) |  |  |  |
| SSC-B/Group 4 metal in reactor 1 (mol/mol) |  |  |  |

TABLE 1-continued

CONTINUED
Manufacturing Conditions

| | Comparative Example 8 | Comparative Example 9 | Comparative Example 10 |
|---|---|---|---|
| Catalyst feed in reactor 2-PI (ppm of Ti) | | 0.69 | |
| Catalyst feed in reactor 2-(ppm of Ti) | 4.7 | | |
| Catalyst feed in reactor 2-Tert-butyl chloride/Butyl(ethyl) magnesium (mol/mol) | 2.0 | | |
| Catalyst feed in reactor 2-Diethylaluminium ethoxide/Titanium tetrachloride (mol/mol) | 1.4 | | |
| Catalyst feed in reactor 2-Triethylaluminium/Titanium tetrachloride (mol/mol) | 0.4 | | |
| Catalyst feed in reactor 2-Butyl(ethyl)magnesium/Titanium tetrachloride (mol/mol) | 7.0 | | |
| Polyethylene production rate (kg/h) | 94.1 | | |

TABLE 2

Deconvolution Results to Describe the Overall Molecular Weight Distribution

| | Example 1 | Example 2 |
|---|---|---|
| 1st ETHYLENE POLYMER (R1-Deconvolution Studies) | | |
| Catalyst System | PI-cat | PI-cat |
| Weight Fraction (%) | 29% | 26% |
| $M_n$ | 53,915 | 50,107 |
| $M_w$ | 107,831 | 100,214 |
| $M_z$ | 161,747 | 150,321 |
| Polydispersity Index ($M_w/M_n$) | 2.0 | 2.0 |
| Branch Freq/1000C (SCB1) | 1.4 | 3.6 |
| Density Estimate (g/cm$^3$) (d1) Equation (1) | 0.9370 | 0.9316 |
| Melt Index $I_2$ Estimate (g/10 min) Equation (2) | 0.63 | 0.83 |
| 2nd ETHYLENE POLYMER (R2-Deconvolution Studies) | | |
| Catalyst System | ZN | ZN |
| Weight Fraction (%) | 71% | 74% |
| $M_n$ | 19,974 | 19,875 |
| $M_w$ | 49,054 | 49,062 |
| $M_z$ | 94,329 | 94,638 |
| Polydispersity Index ($M_w/M_n$) | 2.5 | 2.5 |
| Branch Freq/1000C (SCB2) | 0.4 | 1.0 |
| Density Estimate (g/cm$^3$) (d2) Equation (1) | 0.9514 | 0.9491 |
| Melt Index $I_2$ Estimate (g/10 min) Equation (2) | 13.49 | 13.48 |
| OVERALL ETHYLENE POLYMER (Deconvolution Studies) | | |
| $M_n$ | 23,453 | 22,709 |
| $M_w$ | 63,840 | 60,416 |
| $M_z$ | 119,603 | 112,405 |
| Polydispersity Index ($M_w/M_n$) | 2.7 | 2.7 |

TABLE 3a

Resin Characteristics

| | Example 1 | Example 2 | Example 3 | Example 4 |
|---|---|---|---|---|
| Density (g/cm$^3$) | 0.9506 | 0.9452 | 0.9412 | 0.9422 |
| Melt Index $I_2$ (g/10 min) | 6.4 | 6.4 | 6.7 | 7.75 |
| Melt Index $I_{21}$ (g/10 min) | 129 | 133 | 136 | 184 |
| Stress Exponent | 1.19 | 1.20 | 1.18 | 1.23 |
| Melt Flow Ratio ($I_{21}/I_2$) | 20.3 | 20.9 | 20.1 | 23.8 |
| CTREF/CTREF SLOW | | | | |
| High Elution Peak (° C.) | | | 95.1 | 94.9 |
| Low Elution Peak (° C.) | | | 85.9 | 86.0 |
| $CDBI_{50}$ | | | 62.8 | 68.8 |
| Branch Frequency-FTIR | | | | |
| Branch Freq/1000C | 1.9 | 3.5 | 4.2 | 4.4 |
| Comonomer ID | octene | octene | octene | octene |
| Comonomer Content (mole %) | 0.4 | 0.7 | 0.8 | 0.9 |
| Comonomer Content (wt %) | 1.5 | 2.7 | 3.3 | 3.4 |
| Internal Unsat/100C | 0 | 0.001 | 0.002 | 0.003 |
| Side Chain Unsat/100C | 0 | 0 | 0.001 | 0.001 |
| Terminal Unsat/100C | 0.043 | 0.043 | 0.054 | 0.056 |
| GPC-Conventional | | | | |
| $M_n$ | 20,349 | 22,923 | 22,572 | 23,948 |
| $M_w$ | 67,425 | 94,999 | 62,322 | 62,255 |
| $M_z$ | 136,239 | 247,612 | 117,398 | 125,666 |
| Polydispersity Index ($M_w/M_n$) | 3.31 | 4.14 | 2.8 | 2.6 |
| Index (M2/Mw) | 2.0 | 2.6 | 1.9 | 2.0 |

TABLE 3a-continued

Resin Characteristics

| | Example 1 | Example 2 | Example 3 | Example 4 |
|---|---|---|---|---|
| Branch Frequency GPC-FTIR | | | | |
| Comonomer Distribution | Reverse | Reverse | Reverse | Reverse |
| Rheology | | | | |
| Zero Shear Viscosity-190° C. (Pa-s) | 1396 | 1401 | 1266 | 1152 |
| Relative Elasticity G'/G" at 0.05 rad/s-190° C. | 0.022 | 0.017 | 0.013 | 0.014 |
| Mean Melt Strength-190° C. (CN) | 1.02 | 0.94 | 0.68 | 0.66 |
| Mean Stretch Ratio-190° C. (%) | 1388.8 | 1502.5 | 1440.7 | 1581.7 |

TABLE 3b

Resin Characteristics

| | Comparative Example 5 | Comparative Example 6 | Comparative Example 7 | Comparative Example 8 |
|---|---|---|---|---|
| Density (g/cm³) | 0.9477 | 0.9436 | 0.9408 | 0.9381 |
| Melt Index $I_2$ (g/10 min) | 6.94 | 5.99 | 6.63 | 4.56 |
| Melt Index $I_{21}$ (g/10 min) | 205 | 154 | 156 | 108 |
| Stress Exponent | 1.31 | 1.27 | 1.24 | 1.24 |
| Melt Flow Ratio ($I_{21}/I_2$) | 29.5 | 25.6 | 23.5 | 23.7 |
| CTREF/CTREF SLOW | | | | |
| High Elution Peak (° C.) | 97.5 | | 97.6 | 95.6 |
| Low Elution Peak (° C.) | | | | 83.3 |
| $CDBI_{50}$ | terpolymer | | 42.2 | 52.3 |
| Branch Frequency-FTIR | | | | |
| Branch Freq/1000C | C4 (1-butene) and C8 (1-octene) | 5.9 | 5.4 | 5.1 |
| Comonomer ID | C4 and C8 | Hexene | hexene | octene |
| Comonomer Content (mole %) | C4 and C8 | 1.2 | 1.1 | 1.0 |
| Comonomer Content (wt %) | C4 and C8 | 3.4 | 3.2 | 3.8 |
| Internal Unsat/100C | 0.001 | 0 | 0.001 | 0.003 |
| Side Chain Unsat/100C | 0 | 0.004 | 0.001 | 0.000 |
| Terminal Unsat/100C | 0.011 | 0.011 | 0.015 | 0.054 |
| GPC-Conventional | | | | |
| $M_n$ | 22,081 | 15,603 | 25,692 | 24,649 |
| $M_w$ | 72,138 | 69,049 | 69,741 | 66,330 |
| $M_z$ | 177,243 | 171,744 | 166,490 | 131,250 |
| Polydispersity Index ($M_w/M_n$) | 3.3 | 4.43 | 2.7 | 2.7 |
| Index ($M_z/M_w$) | 2.5 | 2.5 | 2.4 | 2.0 |
| Branch Frequency GPC-FTIR | | | | |
| Comonomer Distribution | Reverse | Normal | Normal | Reverse |
| Rheology | | | | |
| Zero Shear Viscosity-190° C. (Pa-s) | 1639 | | 1383 | 2013 |
| Relative Elasticity G'/G" at 0.05 rad/s-190° C. | 0.046 | | 0.020 | 0.019 |
| Mean Melt Strength-190° C. (CN) | | | 0.79 | |
| Mean Stretch Ratio-190° C. (%) | | | 1813.4 | |

TABLE 3c

Resin Characteristics

| | Comparative Example 9 | Comparative Example 10 |
|---|---|---|
| Density (g/cm³) | 0.9365 | 0.937 |
| Melt Index $I_2$ (g/10 min) | 5.03 | 5.06 |
| Melt Index $I_{21}$ (g/10 min) | 160 | 249 |
| Stress Exponent | 1.34 | 1.48 |
| Melt Flow Ratio ($I_{21}/I_2$) | 31.8 | 49.2 |
| CTREF/CTREF SLOW | | |
| High Elution Peak (° C.) | 89.1 | 89.2 |
| Low Elution Peak (° C.) | 85.3 | 84.3 |
| $CDBI_{50}$ | 82 | 86.5 |
| Branch Frequency-FTIR | | |
| Branch Freq/1000C | 6.2 | 6.7 |
| Comonomer ID | octene | octene |
| Comonomer Content (mole %) | 1.2 | 1.3 |
| Comonomer Content (wt %) | 4.8 | 5.2 |
| Internal Unsat/100C | 0.027 | 0.018 |
| Side Chain Unsat/100C | 0.005 | 0.004 |
| Terminal Unsat/100C | 0.017 | 0.013 |
| GPC-Conventional | | |
| $M_n$ | 27,251 | 23,655 |
| $M_w$ | 68,845 | 71,156 |
| $M_z$ | 154,100 | 212,486 |
| Polydispersity Index ($M_w/M_n$) | 2.5 | 3.0 |
| Index ($M_z/M_w$) | 2.2 | 3.0 |
| Branch Frequency GPC-FTIR | | |
| Comonomer Distribution | Reverse | Reverse |
| Rheology | | |
| Zero Shear Viscosity-190° C. (Pa-s) | 2069 | 2322 |
| Relative Elasticity G'/G" at 0.05 rad/s-190° C. | 0.023 | 0.032 |
| Mean Melt Strength-190° C. (CN) | | |
| Mean Stretch Ratio-190° C. (%) | | |

TABLE 4a

Results From Testing Carried Out on Compression Molded Plaques and Rotomolded Specimens

| | Example 1 | Example 2 | Example 3 | Example 4 |
|---|---|---|---|---|
| Tensile and Flexural Properties (Plaques) | | | | |
| Tensile Yield Strength (MPa) | 27.5 | 23.9 | 21.5 | 21.8 |
| Tensile Ultimate Strength-Stress at break (MPa) | 30.5 | 30.5 | 29.3 | 16.2 |

TABLE 4a-continued

Results From Testing Carried Out on Compression Molded Plaques and Rotomolded Specimens

|  | Example 1 | Example 2 | Example 3 | Example 4 |
|---|---|---|---|---|
| Tensile Sec Mod 1% (MPa) | 1279.6 | 1074 | 856 | 886 |
| Flex Secant Mod. 1% (MPa) | 1136 | 946 | 840 | 841 |
| Impact Properties (Plaques) | | | | |
| Izod Impact (ft-lb/in) | 1.5 | 1.1 | 2.5 | 1.6 |
| Tensile Impact (ft-lb/in$^2$) | 91.8 | 112.7 | 134.7 | 120.6 |
| Environmental Stress Crack Resistance | | | | |
| ESCR Cond. B at 10% CO630 (hrs) | 21 | 21 | 5-22 | 5-16 |
| ESCR Cond. B at 100% CO630 (hrs) | 17 | 25 | 51 | 55 |
| Rotomolding Performance (1/4" molded part thinness) | | | | |
| Optimal times (min) at 560° F. oven temperature | 18-20 | 18-20 | 18-20 | 18-20 |
| Mean Failure Energy (ft. lb) at optimal conditions | 180-189 | 188-181 | 155-193 | 180-193 |
| Ductility (%) at optimal conditions | 100-100 | 100-100 | 100-91 | 100-91 |
| As is density (g/cm$^3$) at optimal conditions | 0.9540-0.9439 | 0.9475-0.9476 | 0.9428-0.9425 | 0.9430-0.9423 |

TABLE 4b

Results From Testing Carried Out on Compression Molded Plaques and Rotomolded Specimens

|  | Comparative Example 5 | Comparative Example 6 | Comparative Example 7 | Comparative Example 8 |
|---|---|---|---|---|
| Tensile and Flexural Properties (Plaques) | | | | |
| Tensile Yield Strength (MPa) | 22.5 | 22.7 | 21.7 | 20.7 |
| Tensile Ultimate Strength-Stress at break (MPa) | 16.5 | 15.9 | 14.1 | 29.3 |
| Tensile Sec Mod 1% (MPa) | 961 | 1017.9 | 909.8 | 864 |
| Flex Secant Mod. 1% (MPa) | 933 | 952 | 897 | 814 |
| Impact Properties (Plaques) | | | | |
| Izod Impact (ft-lb/in) | | 1.5 | 1.4 | |
| Tensile Impact (ft-lb/in$^2$) | | 92.0 | 79.1 | |
| Environmental Stress Crack Resistance | | | | |
| ESCR Cond. B at 10% CO630 (hrs) | 42 | 189 | 7-22 | 92 |
| ESCR Cond. B at 100% CO630 (hrs) | 15 | 81 | 30 | >1000 |
| Rotomolding Performance (1/4" molded part thinness) | | | | |
| Optimal times (min) at 560° F. oven temperature | 18-20 | 20-22 | 18-20 | 20-22 |
| Mean Failure Energy (ft. lb) at optimal conditions | 164-184 | 58-110 | 57-84 | 172-183 |
| Ductility (%) at optimal conditions | 63-75 | 0-7 | 0-0 | 100-100 |
| As is density (g/cm$^3$) at optimal conditions | 0.9514-0.9512 | 0.9445-0.9442 | 0.9401-0.9397 | 0.9422-0.9422 |

TABLE 4c

Results From Testing Carried Out on Compression Molded Plaques and Rotomolded Specimens

|  | Comparative Example 9 | Comparative Example 10 |
|---|---|---|
| Tensile and Flexural Properties (Plaques) | | |
| Tensile Yield Strength (MPa) | 21.6 | 19.6 |
| Tensile Ultimate Strength-Stress at break (MPa) | 14.3 | 15.3 |
| Tensile Sec Mod 1% (MPa) | 875 | 780 |
| Flex Secant Mod. 1% (MPa) | 784 | 694 |
| Impact Properties (Plaques) | | |
| Izod Impact (ft-lb/in) | | |
| Tensile Impact (ft-lb/in$^2$) | | |
| Environmental Stress Crack Resistance | | |
| ESCR Cond. B at 10 % CO630 (hrs) | 79 | 144 |
| ESCR Cond. B at 100 % CO630 (hrs) | >1008 | >1006 |
| Rotomolding Performance (1/4" molded part thinness) | | |
| Optimal times (min) at 560° F. oven temperature | 18-20 | 18-20 |
| Mean Failure Energy (ft. lb) at optimal conditions | 171-187 | 164-173 |
| Ductility (%) at optimal conditions | 100-100 | 60-27 |
| As is density (g/cm$^3$) at optimal conditions | 0.9392-0.9391 | 0.9397-0.9397 |

INDUSTRIAL APPLICABILITY

Provided are high density polyethylene compositions which offer high stiffness and ductility and which may be useful in the preparation of rotomolded articles.

The invention claimed is:

1. A bimodal polyethylene composition having
   1) A molecular weight distribution, Mw/Mn, of from 2.3 to 5.5;
   2) A density of from 0.940 to 0.957 g/cc;
   3) A melt index, $I_2$, as measured by ASTM D1238 at 190° C. using a 2.16 kg load of from 4 to 10 grams per 10 minutes; and
   4) A relative elasticity, G'/G" when measured at 190° C. and 0.05 rad/second of less than 0.03 rad/sec,
   wherein the bimodal polyethylene composition comprises:
   A. from 10 to 70 weight % of a first ethylene copolymer having:
      A.i. a melt index, $I_2$, as measured by ASTM D1238 at 190° C. using a 2.16 kg load of from 0.4 to 5 grams per 10 minutes;
      A.ii. a molecular weight distribution, Mw/Mn, of from 1.8 to 3.0; and
      A.iii. a density of from 0.920 to 0.950 g/cc;
   B. from 90 to 30 weight % of a second ethylene copolymer having:
      B.i. a melt index, $I_2$, as measured by ASTM D1238 at 190° C. using a 2.16 kg load of from 4 to 1500 grams per 10 minutes;
      B.ii. a molecular weight distribution, Mw/Mn, of from 2.3 to 6.0; and
      B.iii. a density that is greater than the density of the first ethylene copolymer but less than 0.967 g/cc;
   with the proviso that the density of the first ethylene copolymer is lower than the density of the second ethylene copolymer by an amount of from 0.010 to 0.035 g/cc.

2. The bimodal polyethylene composition of claim 1, wherein the first ethylene copolymer further exhibits:
- A.iv. a number average molecular weight, Mn, of from 35,000 to 80,000;
- A.v. a weight average molecular weight, Mw, of from 70,000 to 150,000;
- A.vi. an Mz of from 120,000 to 250,000;
- A.vii. Mw/Mn of from 2 to 3;
- A.viii. a number of short chain branches (SCB1) per thousand carbon atoms of from 1 to 5; and
- A.ix. a melt index, $I_2$, as measured by ASTM D1238 at 190° C. using a 2.16 kg load of from 0.5 to 4.0 grams per 10 minutes.

3. The bimodal polyethylene composition of claim 1, wherein the second ethylene copolymer further exhibi:
- A.iv. a number average molecular weight, Mn, of from 12,000 to 30,000;
- A.v. a weight average molecular weight, Mw, of from 28,000 to 72,000;
- A.vi. an Mz of from 70,000 to 150,000;
- A.vii. an Mw/Mn of from 2.3 to 5.0;
- A.viii. a number of short chain branches (SCB2) per thousand carbon atoms of from 0.1 to 2;
- B.ix. a density greater than the density of the first ethylene copolymer but less than 0.965 g/cc;
- B.x. a melt index, $I_2$, as measured by ASTM D1238 at 190° C. using a 2.16 kg load of from 4 to 100 grams per 10 minutes;
- with the proviso that the density of said first ethylene copolymer is lower than the density of the second ethylene copolymer by an amount of from 0.010 to 0.030 g/cc.

4. A rotomolded part comprising the bimodal polyethylene composition of claim 1.

5. The rotomolded part of claim 4 having a ductility index of from 80 to 100%.

6. The rotomolded part of claim 5 having a mean failure energy greater than 120 ft·lb on 0.250 inches thick specimens tested according to ASTM D5628 at a test temperature of −40° C.

7. The rotomolded part of claim 4, wherein the first ethylene copolymer is prepared with a single site catalyst and the second ethylene copolymer is prepared with a Ziegler Natta catalyst.

8. The bimodal polyethylene composition of claim 1, wherein the bimodal polyethylene composition has a comonomer content of less than 1.2 mol % as determined by FTIR method.

9. The bimodal polyethylene composition of claim 1, wherein the first and second ethylene copolymers are copolymers of ethylene and 1-octene.

10. The bimodal polyethylene composition of claim 1, wherein the bimodal polyethylene composition is prepared by contacting ethylene and an alpha-olefin with a polymerization catalyst under solution polymerization conditions in a least two polymerization reactors.

11. A process for the production of polyolefin hollow articles, the process comprising charging the bimodal polyethylene composition of claim 1 into a mold, heating the mold in an oven to above 280° C., such that the stabilized polyolefin fuses, rotating the mold around at least 2 axes, the plastic material spreading to the walls, cooling the mold while still rotating, opening it, and taking the resultant hollow article out.

* * * * *